Figure 1:
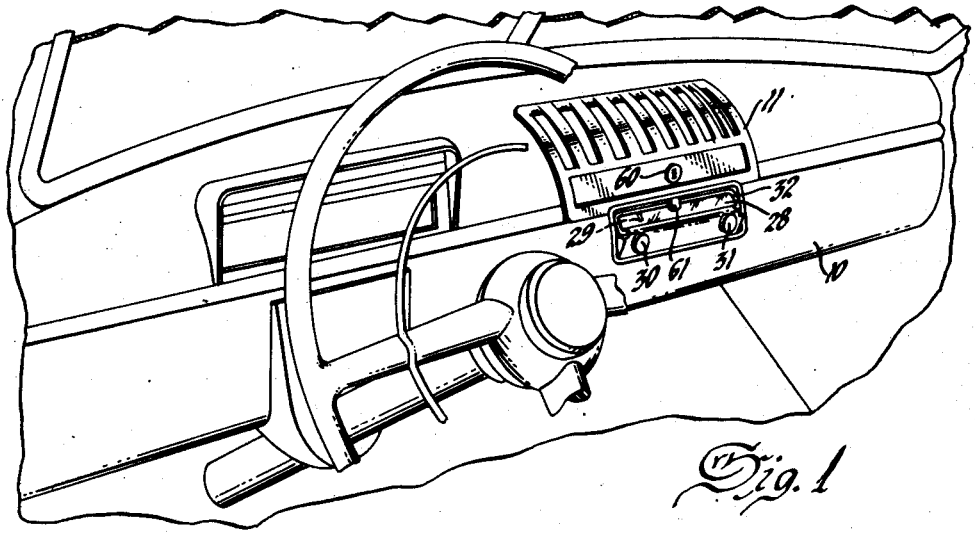

Dec. 15, 1953   B. A. SCHWARZ   2,662,975
COMBINATION RADIO RECEIVER
Filed Jan. 23, 1951   3 Sheets-Sheet 1

Inventor
Bertram A. Schwarz
By Willits, Helwig & Baillio
Attorneys

Dec. 15, 1953  B. A. SCHWARZ  2,662,975
COMBINATION RADIO RECEIVER
Filed Jan. 23, 1951  3 Sheets-Sheet 2
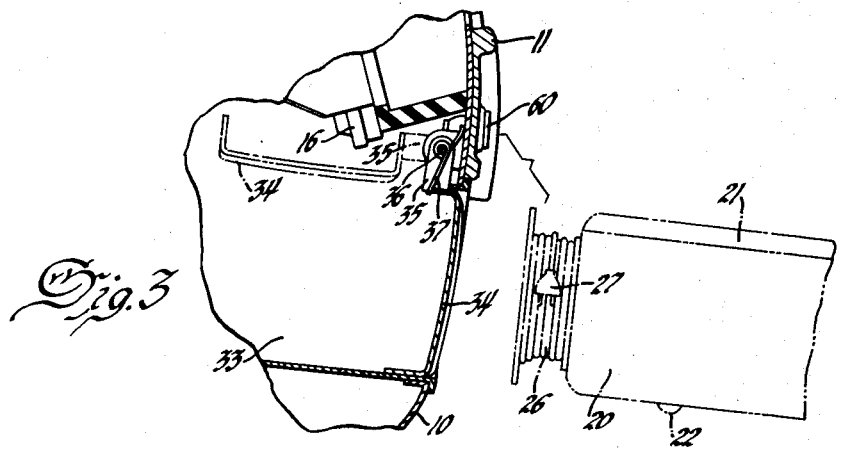
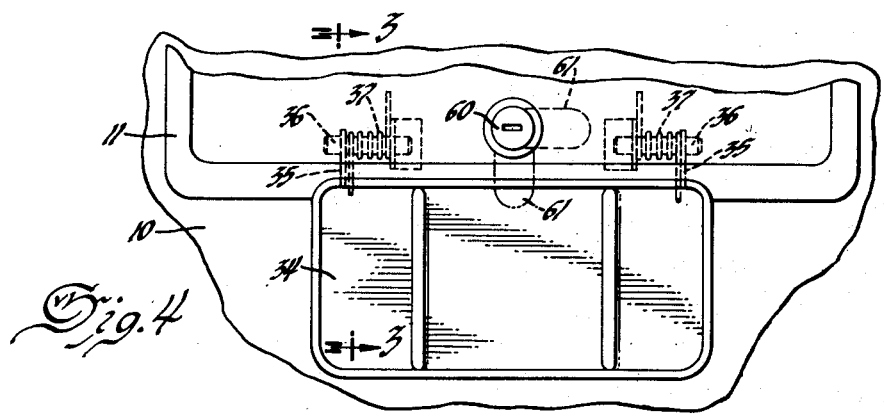
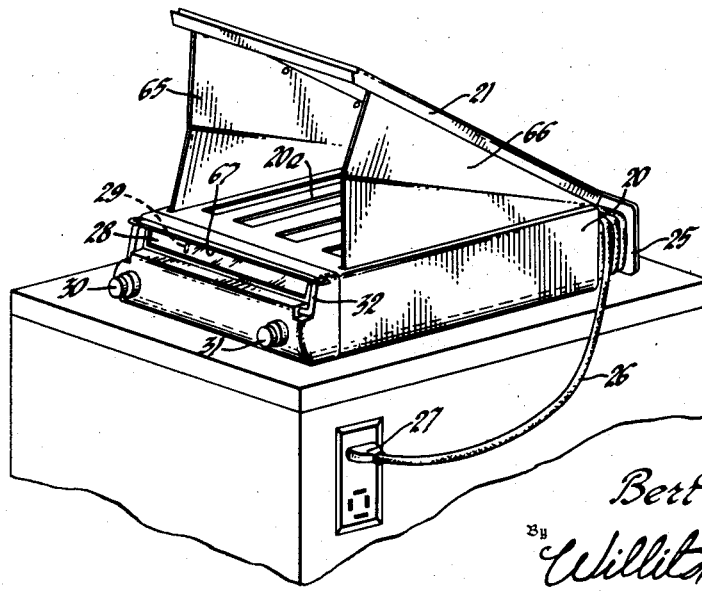
Inventor
Bertram A. Schwarz
By Willits, Helmig & Baillio
Attorneys Patented Dec. 15, 1953

2,662,975

UNITED STATES PATENT OFFICE 2,662,975

COMBINATION RADIO RECEIVER

Bertram A. Schwarz, Kokomo, Ind., assignor to General Motors Corporation, Detroit, Mich., a corporation of Delaware Application January 23, 1951, Serial No. 207,274

11 Claims. (Cl. 250—14)

This invention relates to a combination radio receiver, and more particularly to a combination automobile and portable radio receiver.

Under many circumstances it is desirable to provide a combination radio receiver comprising a portable unit and a fixed unit so arranged that the portable unit may be removed and used alone as a radio receiver. For example, it is often desirable to remove the radio receiver from an automobile and use it with a different power source, as for example, a conventional commercial 110 volt power source. In the past, attempts have been made to provide a combination automobile and portable radio of this type by mounting the radio receiver on the seat, in the glove compartment, or the like, the entire receiver being removable from the automobile when desired.

Such prior art constructions have proved unsatisfactory since they were too bulky and clumsy when compared to other portable radios, and since they did not have high amplitude audio power output and good tone quality, which are necessary in an automobile radio. As a result of these deficiencies the receivers were merely poor compromises, and were neither good portable receivers nor good automobile receivers. Because of engine noises and noises caused by the wind when an automobile is traveling at high speed, it is essential that an automobile radio receiver have high amplitude audio power output and good tone. In order to provide these qualities a high amplitude power output stage is provided to drive a relatively large speaker. On the other hand, one of the most desirable features of a portable type radio is that it be small, light and compact. It is impossible to provide a single unit receiver having this desirable feature and at the same time having the hgh amplitude audio output and good tone necessary in an automobile radio.

This invention provides a combination radio receiver comprising a fixed unit and a portable unit. The fixed unit may be mounted in an automobile and includes a conventional automobile type vibratory power supply, a conventional automobile type mast antenna, and a high amplitude audio driver stage and a relatively large speaker for providing the high amplitude audio output and good tone necessary in an automobile radio. The portable unit comprises another antenna, which may be a loop antenna, a power supply adapted to be energized from a different source, as for example, a conventional commercial 110 volt source, and radio receiver elements including signal amplifying and detecting means, and a relatively low amplitude output audio stage, and a speaker which may be smaller than the automobile speaker.

The portable unit may be readily removably positioned in a compartment closely adjacent the fixed unit and connected thereto so that when in this position the complete radio receiver comprises the automobile mast antenna, the automobile power supply, the signal amplifying and detecting means of the portable unit, and the power output or driver stage and speaker of the fixed unit. When in this position the loop antenna, power supply, audio output stage and speaker of the portable unit are disconnected.

The construction is such that the portable unit is automatically connected to the fixed unit when it is positioned adjacent the fixed unit, and this same positioning movement operates switching means so that when the portable unit is removed from the fixed unit the antenna, power supply and audio output stage and speaker of the fixed unit is disconnected, and the antenna power supply and audio output stage and speaker of the portable unit are connected, the portable unit thus being a complete receiver.

Among other features of the invention, means are provided for locking the portable unit in the automobile to prevent its unauthorized removal; the compartment in the automobile which receives the portable unit is provided with a spring loaded closure member which is movable to an out of the way position by the portable unit upon movement of the portable unit into the compartment; and a carrying handle is provided on the portable unit, this handle being held in an out of the way position by a member on the locking means when the portable unit is mounted adjacent the fixed unit, the handle moving to operative carrying position when the portable unit is unlocked.

Figure 2:
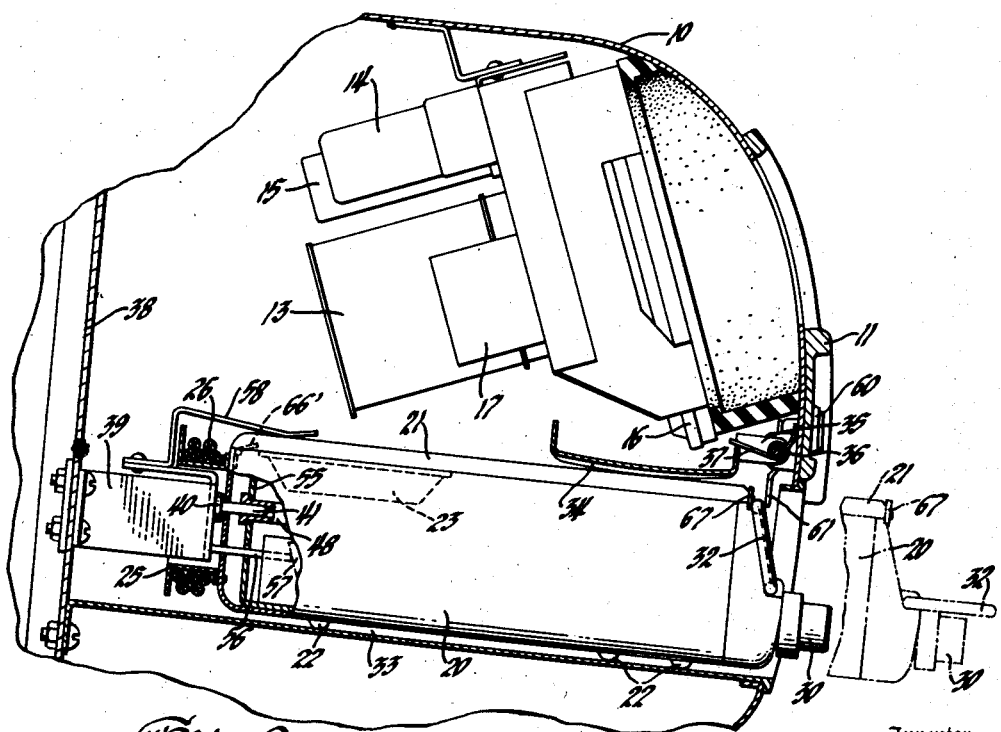
Figure 6:
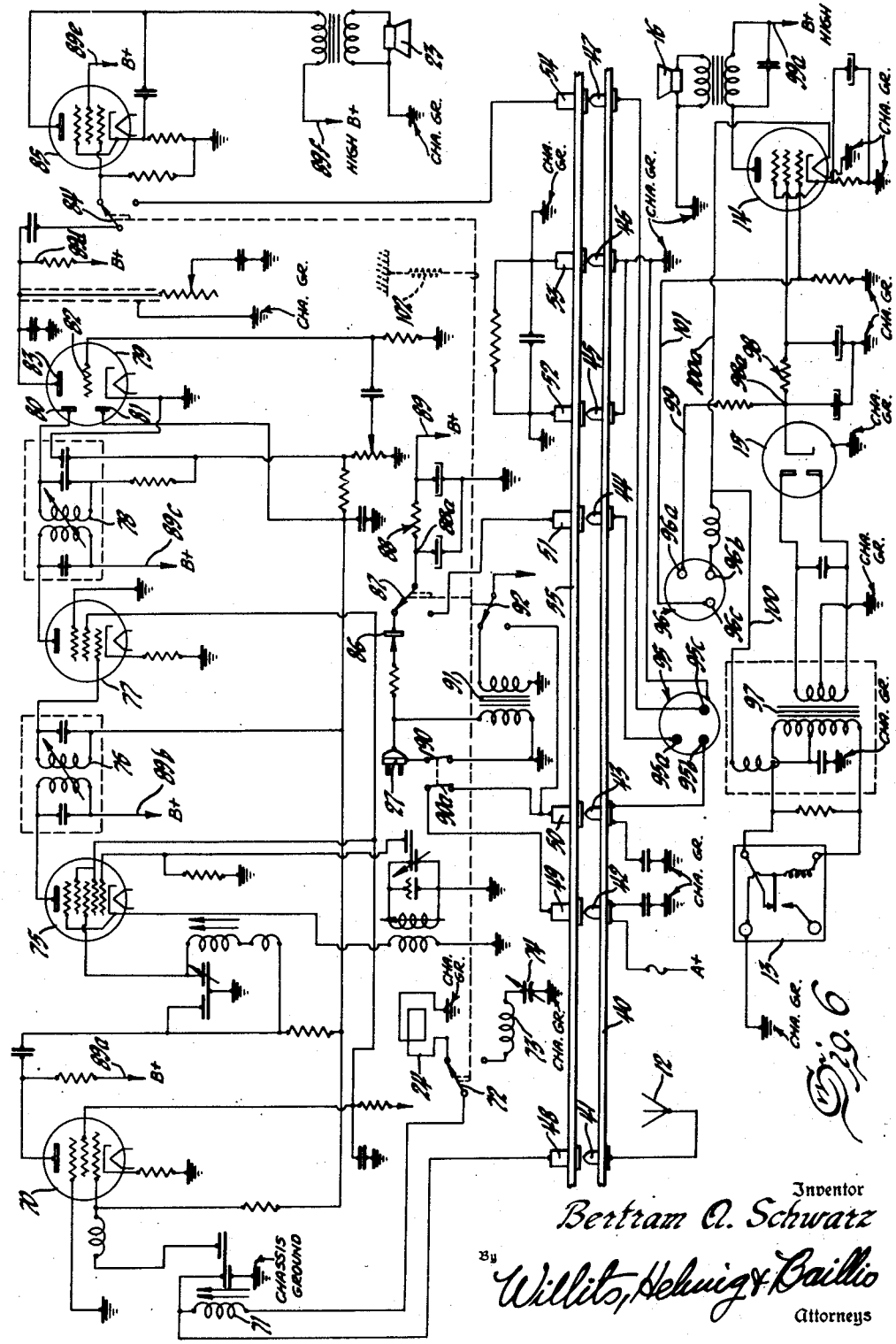

Other features and advantages of the invention will be apparent from the following description, and from the drawings, in which:

Figure 1 is a perspective view of a portion of the instrument panel of an automobile having the improved combination radio receiver mounted thereon; Figure 2 is an enlarged fragmentary section through the instrument panel of Figure 1, a portion of the portable unit being broken away to show underlying structure, and the portable unit being shown fragmentarily in broken lines in another position; Figure 3 is a section similar to a portion of Figure 2, but with the portable unit removed, Figure 3 being taken along the line 3—3 of Figure 4; Figure 4 is a front elevational view of the apparatus of Figure 3; Figure 5 is a perspective view of the portable unit alone and in operative position; and Figure 6 is a schematic circuit diagram of the radio receiver.

Referring now more particularly to the drawings, the radio receiver is adapted to be mounted on the instrument panel 10 of an automobile, the panel being provided with a grille member 11 behind which the automobile speaker is housed.

The combination radio receiver includes a fixed unit and a portable unit. The fixed unit is permanently mounted in the automobile and includes a conventional mast antenna (shown schematically at 12 in Figure 6), a conventional vibratory power supply 13, an audio power amplifier or driver tube 14, a rectifier tube 15, and a speaker 16, the speaker coil housing being designated in Figure 2 at 17. All of this apparatus except the antenna 12 is mounted on the rear side of the instrument panel behind the speaker grille 11.

The portable unit comprises a housing 20 having a hingedly mounted top 21 and having a plurality of detents 22 on its bottom surface to facilitate sliding movement of the housing 20. Within the housing 20 is a speaker 23, as well as a power supply, signal amplifier and detecting means and a power amplifier, as will hereinafter be described in connection with Figure 6. In the hingedly mounted top 21 is a loop antenna 24 shown schematically in Figure 6. Secured to the rear wall of the housing 20 is a reel 25 upon which is wound a conventional line cord 26 terminating in a plug 27. The front panel of the housing 20 includes a dial 28 having an indicator or pointer 29, a conventional off-on and volume control knob 30 and a tuning control knob 31. A carrying handle 32 is also on the front panel and is preferably spring loaded so that it normally assumes its operative carrying position as shown in broken lines in Figure 2.

The portable unit 20 is housed in a compartment 33 adjacent and below the elements of the fixed unit. This compartment has a closure member 34 which is carried on brackets 35 pivotally mounted on pins 36. Springs 37 urge the closure member 34 toward closed position where it closes the entrance of the compartment 33, as shown in Figures 3 and 4. When the portable unit is inserted in the compartment 33 it causes the closure member to pivot to an out of the way position as shown in Figure 2.

Mounted on the fire wall 38 of the automobile in the rear of the compartment 33 is a support 39 which carries a terminal block 40 having thereon a plurality of plugs 41—47 (Figure 6). These plugs cooperate with a plurality of jacks 48—54 which are carried on a terminal block 55 in the housing 20 of the portable unit for readily removably connecting the portable unit to the fixed unit, the connections being automatically made when the housing 20 is slid into the compartment 33. The support 39 has a finger 56 projecting forwardly therefrom, and the rear wall of the portable unit housing 20 and the terminal block 55 are apertured to receive the finger 56, said finger engaging a cam switch-actuating member 57 in the housing 20. A spring clip 58 holds the housing 20 against vibration.

In order that the portable unit 20 may not be removed without authorization, a lock 60 is provided, this lock having a locking member 61 which is adapted to engage the carrying handle 32 of the portable unit and retain this handle in an out of the way position as shown best in Figures 1 and 2. When the lock is released the carrying handle moves under spring pressure to its operative position as shown in broken lines in Figure 2.

When the portable unit is mounted in the compartment 33, both the portable and fixed units cooperate to provide a radio receiver having the high audio output and good tone desired in an automobile radio, the elements of the fixed unit being in the radio circuit as will appear in detail hereinafter in connection with Figure 6. In order to utilize the combination as an automobile radio, it is merely necessary to slide the portable unit housing 20 into the compartment 33. During this movement the housing 20 engages the closure member 34 and causes it to pivot to its out of the way position as shown in Figure 2, and the jacks 48—54 are automatically aligned with the plugs 41—47 so that when the housing as inserted in the compartment 33 the portable unit is readily removably connected to the fixed unit. During the movement into the compartment 33 the actuating finger 56 engages the cam switch-actuating member 57 to switch the fixed unit elements into the circuit. The handle 32 may then be pivoted to its out of the way position and the portable unit locked in place.

When it is desired to use the portable unit alone outside of the automobile, the lock 60 is unlocked with a key, pivoting the member 61 and releasing the handle 32, which handle moves under spring pressure to operating or carrying position. The handle may then be grasped and the portable unit pulled out of the compartment 33. The spring 37 causes the closure 34 to pivot down to the position of Figures 3 and 4, closing the opening to the compartment 33.

Figure 5 shows the portable unit in operating condition. The plug 27 is plugged into a conventional 110 volt wall outlet and the top 21 is opened. The top 21 houses the loop antenna 24, bringing this antenna into operative position when the top is opened. The top 21 is connected to the housing 20 at opposite sides by bellows members 65 and 66 which form a horn for the speaker 23 of the portable unit, said speaker being mounted adjacent the top of the housing immediately below the grille structure 20a. A spring 66' (Figure 2), automatically opens the top 21 when a catch 67 is released, and when the cover is open the catch 67 may be used to retain the handle 32 in its out of the way position. The control knobs 30 and 31 may be manipulated to operate the portable unit in the same manner as when the portable unit is mounted in the automobile.

Figure 6 shows schematically the circuit of the combination receiver. The portable unit includes a radio frequency amplifier tube 70 having its signal grid coupled to an antenna coil 71, this coil being connected to the loop antenna 24 when the parts are in the position illustrated by means of a switch 72. When the switch 72 is in its other position, the loop antenna 24 is disconnected from the coil 71 and the coil 71 is connected to ground through a coil 73 and a condenser 74. The mast antenna 12 of the automobile may be connected to the coil 71 through the plug 41 and the jack 48.

The output of the tube 70 is coupled into a first detector and mixer tube 75 having its output coupled through a first intermediate frequency transformer 76 to an intermediate frequency amplifier tube 77. The output of the tube 77 is coupled through a second intermediate transformer 78 to a tube 79 which includes a second detector anode 80, an automatic volume control anode 81, and a first audio frequency amplifier triode having a grid 82 and an anode 83. The audio output in the circuit of the triode anode 83 is coupled through a switch 84 to an audio output or driver tube 85, the output of which actuates the speaker 23.

The portable unit is shown as having an A. C. power supply including a selenium rectifier 86 which is connected at its one side to the alternating current source through the line cord plug 27, and which is connected at its other side through a switch 87 to a filter which is designated generally at 88. A B plus lead 89 is connected to the other side of the filter and extends to the various tubes of the unit. For simplicity of illustration the B plus lead is broken away and the connections to the various tubes are designated at 89a—89e. High B plus lead 89f is connected to the input side of filter 88 designated by point 88a. The other lead to the plug 27 is connected to a manually operated switch 90, and heater voltage for the tubes in the portable unit is provided by a conventional step-down transformer 91 having its secondary connected to a heater changeover switch 92. In the interest of simplicity, the heater leads are not completely shown. These connections are made in the conventional manner.

In the fixed unit which is mounted in the automobile a terminal plug 95 has terminals 95a, 95b and 95c which are connected respectively with plugs 44, 43 and 47. The terminal plug 95 cooperates with a terminal socket 96 having terminals 96a, 96b and 96c complementary to the respective terminals 95a-c.

The output of the vibrator 13 is connected across the primary of a power transformer 97, the secondary of this transformer being connected to the anodes of the full wave rectifier tube 15, the cathode circuit of this tube including a filter designated generally at 98. B plus voltage for the screen grid of the driver tube 14 is provided from this circuit on one side of the filter and B plus voltage for all of the other tubes in the automobile receiver is provided by a lead 99 which connects (through terminals 96a and 95a) to the plug 44 to provide B plus voltage for the tubes in the portable unit when the switch 87 is in the position other than that shown in Figure 6. High B plus voltage for the anode circuit of the tube 14 is obtained through lead 99a, which may be connected to the input side of filter 98 designated by point 98a.

Power and heater voltage for the fixed unit is obtained through a lead 100 which extends from the primary of transformer 97 to terminal 96b, and lead 100a which extends from the heater of tube 14 to lead 100, and thus to terminal 95b which is connected with the plug 43. Then, when the portable unit is assembled into compartment 33, A plus power will be supplied to the fixed unit through terminal 43 and to the portable unit tube heaters through switch 92 when it is in the position other than that shown in Figure 6, but only when the manually operated switch 90a is closed when the radio is turned on. Switches 90 and 90a are ganged as shown by the broken line in Figure 6, and are operated by off-on control knob 30. The signal grid of the driver tube 14 is connected by a lead 101 with the terminal 96c, this terminal being connected (through terminal 95c) to the plug 47 so that connection is made into the anode circuit of the first audio amplifier tube 79 when the switch 84 is in the position other than that shown in the drawings.

The switches 72, 87, 92 and 84 are all gang-connected as indicated by the broken line shown in Figure 6, and these switches are operated between the position illustrated and the position other than that illustrated by the cam switch-actuating member 57 shown in Figure 2 and a spring 102. When the portable unit is moved into the compartment 33 so that the actuating finger 56 engages the member 57 and causes it to operate the switches, all the switches are moved against the force of the spring 102 to the position other than that shown in Figure 6. Furthermore, movement of the portable unit into the compartment 33 automatically connects the portable unit to the fixed unit through the plugs and jacks. In consequence, when the portable unit is positioned in the automobile the antenna 12 is connected into the circuit through the plug and jack 41—48. At the same time the switch 72 disconnects the loop antenna 24 and connects antenna compensating elements 73 and 74. Plug 45 is connected to plug 46 by a jumper which short circuits jacks 52 and 53 thereby connecting the B minus ground to the chassis ground of the portable unit and simultaneously connecting the chassis ground of the portable unit to the chassis ground of the fixed unit. Simultaneous movement of the switch 92 to the position other than that shown disconnects the secondary of the heater transformer and connects the portable unit tube heaters to the car battery A plus supply through jack 49 and plug 42 when manually operated switch 90a is closed. Movement of the switch 87 to its other position disconnects the selenium rectifier 86 and connects the B plus from the vibrator power supply through the plug 44 and jack 51. The plug 47 and jack 54 connect the signal from the first audio amplifier tube 79 into the signal grid of the driver tube 14 as earlier described when switch 84 is in the position other than shown. When the portable unit is removed from the compartment 33, the spring 102 returns the switches to the position of Figure 6.

The driver tube 85 of the portable unit need have relatively small amplitude output, inasmuch as the speaker 23 is relatively small when compared to a conventional automobile speaker. When the receiver is used as a portable there is no necessity to provide the high audio output and the good tone which are so necessary in an automobile receiver where engine and wind noises are present. Furthermore, the provision of the horn formed by the bellows shown in Figure 4 improves the effective volume and tone even when a small speaker is used. The circuit shown in Figure 6 provides a portable radio and an automobile radio without compromising any desirable features of either.

While the circuit of Figure 6 shows a high voltage power supply adapted for use with A. C. only, if desired the filament transformer 91 may be eliminated and a conventional A. C.-D.C. power supply may be utilized with additional switching for the tube heaters of the portable unit. In this event a special first detector tube which utilizes less current in its heater than the tube illustrated may be desirable. Also, if desired, an external battery power supply may be provided together with circuits to enable the portable unit to operate as a complete receiver without connection to a conventional commercial A. C. or D. C. voltage source.

While I have shown and described one embodiment of my invention, it is subject to many modifications. Changes, therefore, in the construction and arrangement may be made without departing from the spirit and scope of the invention as set forth in the appended claims.

I claim:

1. A combination radio receiver of the character described, comprising: a portable radio receiver unit including signal amplifying and detecting means and a first power amplifier having a first speaker coupled thereto; a fixed unit having a second power amplifier with a second speaker coupled thereto; a single set of turning controls for said combination receiver common to both of said units; means for readily removably connecting said portable unit electrically to said fixed unit including a switch movable between a first position in which said detecting means is connected to said first power amplifier and said first speaker and a second position in which said detecting means is connected to said second power amplifier and said second speaker through said readily removable connecting means; and means for locking said portable unit in a position adjacent said fixed unit to prevent unauthorized removal thereof.

2. A combination automobile and portable radio receiver of the character described, comprising: a portable unit having a first power supply adapted to be energized from an external source and radio receiver elements including signal amplifying and detecting means and a first power amplifier having a first speaker coupled thereto; a fixed unit adapted to be mounted in an automobile, said fixed unit having a second power supply and a second power amplifier having a second speaker coupled thereto; a single set of tuning controls for said combination receiver common to both of said units; means for readily removably mounting said portable unit adjacent said fixed unit; and means for electrically interconnecting said units including switch means movable between a first position in which said receiver elements are connected to said first power supply and said detecting means is connected to said first power amplifier and said first speaker, and a second position in which said receiver elements are connected to said second power supply and said detecting means is connected to said second power amplifier and said second speaker through said readily removable connecting means.

3. Apparatus of the character claimed in claim 2, wherein the means for mounting said portable unit comprise a receptacle adapted to receive said portable unit, and wherein said units are connected through plug and jack means having portions in said receptacle and complementary portions on said portable unit, said connections being automatically made upon movement of said portable unit into said receptacle.

4. A combination automobile and portable radio receiver of the character described, comprising: a portable unit having a first power supply adapted to be energized from an external source and radio receiver elements including signal amplifying and detecting means and a first power amplifier having a first speaker coupled thereto; a fixed unit adapted to be mounted in an automobile, said fixed unit having a second power supply and a second power amplifier having a second speaker coupled thereto; a single set of tuning controls for said combination receiver common to both of said units; means for readily removably mounting said portable unit adjacent said fixed unit comprising a receptacle adapted to receive said portable unit; means for readily removably connecting said units together electrically comprising plug and jack means having portions in said receptacle and complementary portions on said portable unit, said connections being automatically made upon movement of said portable unit into said receptacle; switch means movable between a first position in which said receiver elements are connected to said first power supply and said detecting means is connected to said first power amplifier and said first speaker, and a second position in which said receiver elements are connected to said second power supply and said detecting means is connected to said second power amplifier and said second speaker through said readily removable connecting means; and means for operating said switch means between said two positions automatically upon movement of said portable unit into and out of said receptacle.

5. Apparatus of the character claimed in claim 4, wherein said receptacle has a movable closure member, said member being spring loaded to closed position and being movable to an out of the way position by said portable unit upon movement of said portable unit into said receptacle.

6. A combination automobile and portable radio receiver of the character described, comprising: a portable unit having a loop antenna, a high voltage power supply adapted to be energized from an alternating current source, and radio receiver elements including signal amplifying and detecting means and a relatively low amplitude power amplifier having a relatively small speaker coupled thereto; a fixed unit adapted to be mounted on an automobile, said fixed unit having a mast antenna, a vibratory power supply and a relatively large amplitude power amplifier having a relatively large speaker coupled thereto; means for readily removably mounting said portable unit adjacent said fixed unit comprising a receptacle adapted to receive said portable unit; a closure member pivotally mounted in said receptacle, said member being spring loaded to closed position and being movable to an out of the way position by said portable unit upon movement of said portable unit into said receptacle; means for readily removably connecting said units together electrically comprising plug and jack means having portions in said receptacle and complementary portions on said portable unit, said connections being automatically made upon movement of said portable unit into said receptacle; switch means movable between a first position in which said receiver elements are connected to said loop antenna and high voltage power supply and said detecting means is connected to said low amplitude power amplifier and speaker, and a second position wherein said receiver elements are connected to said mast antenna and vibratory power supply and said detecting means is connected to said high amplitude power amplifier and speaker through said plug and jack connections; means for operating said switch means between said two positions automatically upon movement of said portable unit into and out of said receptacle; and means for locking said portable unit in said receptacle to prevent unauthorized removal thereof.

7. Apparatus of the character claimed in claim 6, wherein said portable unit has a movable carrying handle, and wherein said locking means have a member engaging said handle for retaining said handle in an out of the way position.

8. A combination automobile and portable radio receiver comprising, in combination: a portable radio receiver unit and a fixed unit; said portable unit being removably mounted adjacent said fixed unit and comprising a first antenna, a first power supply, signal amplifying means, converting means, detecting means, and a first power amplifier having a speaker coupled thereto; said fixed unit comprising a second antenna, a second power supply, and a second power amplifier having a speaker coupled thereto; a single set of tuning controls for said combination radio receiver common to both of said units; plug and jack means for readily removably connecting said portable unit electrically to said fixed unit; switch means in one of said units movable between a first position in which said signal amplifying, converting and detecting means of said portable unit are connected to said first antenna and to said first power supply and said detecting means is connected to said first power amplifier and speaker, and a second position in which said signal amplifying, converting and detecting means are connected to said second antenna and to said second power supply and said detecting means is connected to said second power amplifier and speaker through said plug and jack means; and means for operating said switch means between said two positions automatically upon disconnection and connection of said portable and fixed units.

9. A combination radio receiver comprising, in combination: a first unit and a second unit; said first unit being removably mounted adjacent said second unit and having electric circuit means therein including signal amplifying means, detecting means and a first power amplifier having a first speaker coupled thereto; said second unit having electric circuit means therein including a second power amplifier having a second speaker coupled thereto; a single set of tuning controls for said combination receiver common to both of said units; and means for readily removably connecting said first unit electrically to said second unit including switch means for alternatively connecting said detecting means to either of said power amplifiers and their speakers.

10. A combination automobile and portable radio receiver comprising in combination; a portable radio receiver unit and a unit fixed on the instrument panel of an automobile; said portable unit being adapted to be removably mounted adjacent said fixed unit on said instrument panel and including a first power supply, signal amplifying means, converting means, detecting means, and a first power amplifier having a first speaker coupled thereto; said fixed unit including a second power supply and a second power amplifier having a second speaker coupled thereto; a single set of tuning controls for said combination receiver common to both of said units; and means for readily removably connecting said portable unit electrically to said fixed unit including switch means movable between a first position in which said signal amplifying, converting and detecting means and said first power amplifier are energized from said first power supply and said signal amplifying, converting and detecting means are connected to said first power amplifier and said first speaker, and a second position in which said signal amplifying, converting and detecting means and said second power amplifier are energized through said readily removable connecting means from said second power supply and said signal amplifying, converting and detecting means are connected to said second power amplifier and said second speaker.

11. A combination automobile and portable radio receiver comprising, in combination: a portable radio receiver unit and a fixed unit; said portable unit being readily removably mounted adjacent said fixed unit and including a first antenna, a first power supply, signal amplifying means, converting means, detecting means, and a first power amplifier of relatively low power output having a first speaker coupled thereto; said fixed unit including a second antenna, a second power supply, and a second power amplifier of relatively high power output having a second speaker coupled thereto; a single set of tuning controls for said combination radio receiver common to both of said units thereof; plug and jack means for readily removably connecting said portable unit electrically to said fixed unit; switch means in one of said units movable between a first position in which said signal amplifying, converting and detecting means of said portable unit are coupled to said first antenna and are energized from said first power supply with said first power amplifier of said portable unit and in which said detecting means is connected to said first power amplifier and first speaker, and a second position in which said signal amplifying, converting and detecting means are coupled to said second antenna and are energized from said second power supply with said second power amplifier of said fixed unit and in which said detecting means is connected to said second power amplifier and second speaker through said plug and jack means; and means for operating said switch means between said two positions automatically upon disconnection and connection of said portable and fixed units.

BERTRAM A. SCHWARZ.

References Cited in the file of this patent

UNITED STATES PATENTS

| Number | Name | Date |
| --- | --- | --- |
| 1,802,345 | Heina | Apr. 28, 1931 |
| 2,013,331 | Alden | Sept. 3, 1935 |
| 2,071,398 | Frantz et al. | Feb. 23, 1937 |
| 2,077,284 | TePas | Apr. 13, 1937 |
| 2,127,488 | Andrews | Aug. 16, 1938 |
| 2,137,035 | Swallow | Nov. 15, 1938 |
| 2,280,465 | Barrett et al. | Apr. 21, 1942 |
| 2,388,567 | Patterson | Nov. 6, 1945 |
| 2,486,536 | Olson | Nov. 1, 1949 |